United States Patent
Killian et al.

(10) Patent No.: US 11,561,783 B2
(45) Date of Patent: Jan. 24, 2023

(54) WINDOWED WRITES

(71) Applicant: Snap Inc., Santa Monica, CA (US)

(72) Inventors: David Andrew Killian, Seattle, WA (US); Bradley Baron, Seattle, WA (US); Benjamin Ralph Hollis, Seattle, WA (US); Amit Saurav, Sammamish, WA (US); James Daniel Baird, Seattle, WA (US); Zubair Khan, Villa Park, IL (US); Spoorthi Ravi, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 358 days.

(21) Appl. No.: 16/814,064

(22) Filed: Mar. 10, 2020

(65) Prior Publication Data

US 2021/0286609 A1   Sep. 16, 2021

(51) Int. Cl.
*G06F 8/65* (2018.01)
*G06F 16/23* (2019.01)
*G06F 16/2455* (2019.01)
*H04L 51/04* (2022.01)
*H04L 51/216* (2022.01)
*H04L 51/52* (2022.01)
*H04N 21/8547* (2011.01)

(52) U.S. Cl.
CPC ............ *G06F 8/65* (2013.01); *G06F 16/2322* (2019.01); *G06F 16/24556* (2019.01); *H04L 51/04* (2013.01); *H04L 51/216* (2022.05); *H04N 21/8547* (2013.01)

(58) Field of Classification Search
CPC .. G06F 8/65; G06F 16/2322; G06F 16/24556; H04L 51/04; H04L 51/16; H04L 51/32; H04N 21/8547
USPC ........................................... 707/610
See application file for complete search history.

(56) References Cited

U.S. PATENT DOCUMENTS

| 8,001,076 B2 * | 8/2011 | Castaneda | G06F 16/27 707/611 |
| 2013/0091112 A1 * | 4/2013 | Iyer | G06F 16/2272 707/E17.049 |
| 2017/0308602 A1 * | 10/2017 | Raghunathan | G06F 16/273 |

* cited by examiner

*Primary Examiner* — Kuen S Lu
(74) *Attorney, Agent, or Firm* — Schwegman Lundberg & Woessner, P.A.

(57) ABSTRACT

Systems and methods are provided for synchronizing data. The systems and methods include operations for: storing a synchronization entry for a messaging application feature, the synchronization entry comprising a last update timestamp associated with a first update to content of the messaging application feature received from a first source; receiving a second update to the content of the messaging application feature from the first source; determining that the second update was received within a write window of the last update timestamp; in response to determining that the second update was received within the write window of the last update timestamp, preventing updating the last update timestamp; and sending the first update and the second update to a client device in response to receiving a synchronization request from the client device based on the last update timestamp.

20 Claims, 9 Drawing Sheets

WINDOWED WRITES

TECHNICAL FIELD

The present disclosure generally relates to the technical field of social networks. In particular, the present embodiments are generally directed to managing content synchronization.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
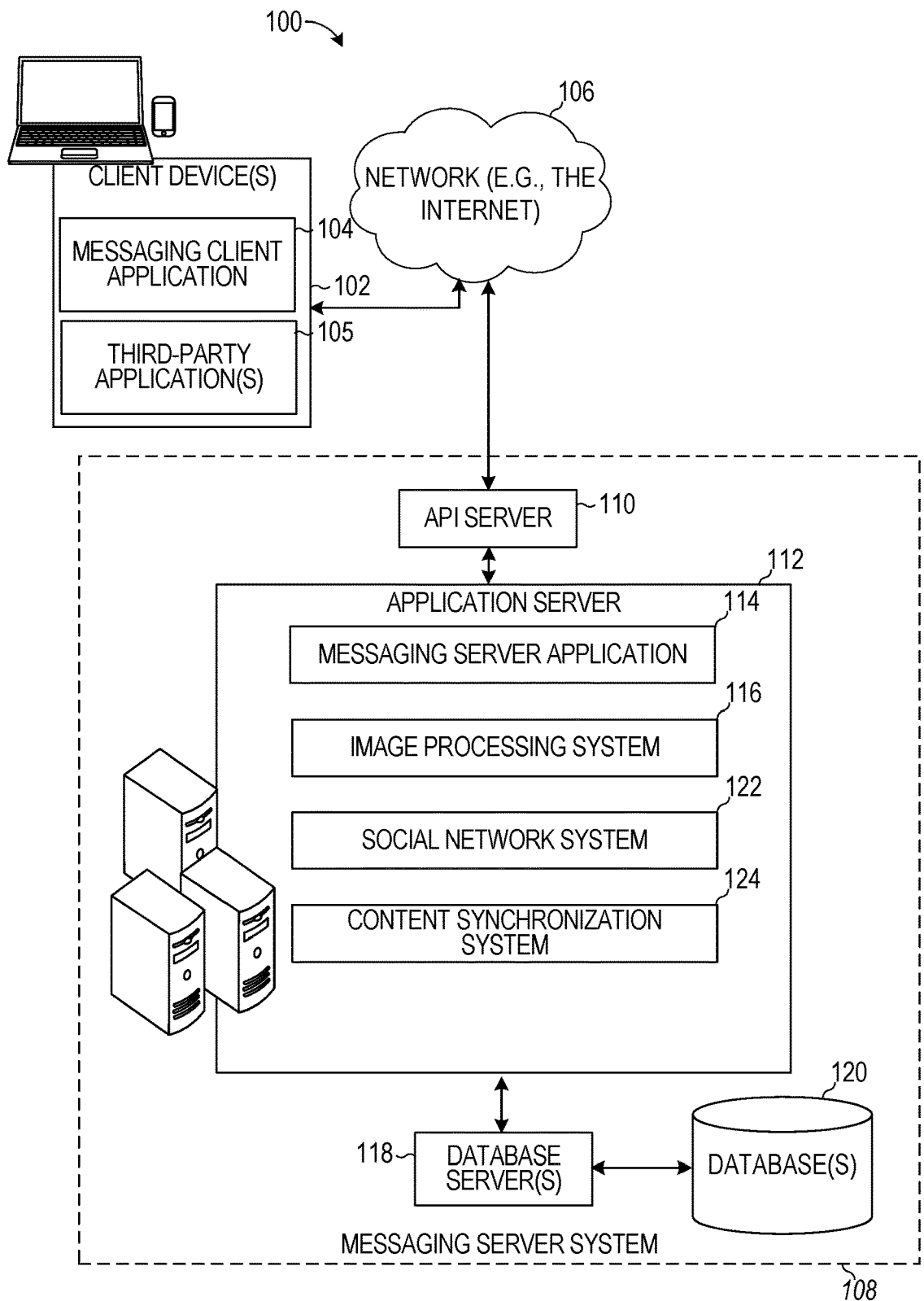
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Such media content is typically exchanged in chat sessions between users and consumes a great deal of processing resources in synchronizing the data across various devices. As such, managing how the data remains synchronized has become of great interest. One way in which the data is synchronized is by maintaining a persistent connection between all the devices and the server and providing updates in real-time to the devices. In this way, as one user updates data or sends a message, that message is instantly transmitted to all intended recipients. Namely, when a given user updates content, a write notification indicating the update is transmitted to all of the intended recipients which then generate respective read requests to obtain the content associated with the update. As such, the number of read requests generated by a given write notification is proportional to the number of write notifications. While such synchronization generally works well, maintaining the persistent connections consumes a great deal of overhead, processing power, bandwidth and battery across devices.

The disclosed embodiments improve the efficiency of using the electronic device by providing a system that efficiently synchronizes data across devices and reduces the number of times notifications are sent to devices indicating updates have been received. Specifically, the disclosed system maintains a synchronization entry on a per user basis that stores information used to control how and when different devices provide and receive updates. Namely, the synchronization entry indicates a last update time for a given source, such as a first user. The last update time is associated with an update received from the given source for a messaging application feature, such as a group messaging feature. As an example, the last update time indicates when the first user last sent a chat message to the group. If the given source has provided an update within less than a certain amount of time, such as before expiry of write window for the given source, an update to the last update time is prevented. This way, the frequency of sending notifications or messages indicating an update has been received from the given source to one or more other user devices is reduced. When a request to synchronize data is received from a client device, a last synchronization time the client device was synchronized is determined and is offset by a synchronization window. The synchronization window may be the same size as the write window. Updated content that was received following the offset last synchronization time is then retrieved and provided to the client device.

According to the disclosed techniques, the number of fan out writes, such as the number and frequency of write notifications, is reduced based on a size of a write window. Namely, the write window limits the number of times write notifications are sent to intended recipients. As the size of the write window increases (meaning that the last update time is not updated for a longer period of time), the number of fan out read requests, such as the number and frequency of requests to read data corresponding to an update time, increases. As such, the number of read requests is not proportional to the number of times content is updated by a given source but rather is proportional to the size of the write window that limits how many times notifications indicating such updates are generated. In this way, the cost savings in device resources obtained by reducing the number of write notifications is offset by the number of times read requests are generated. However, because read requests consume a smaller amount of processing resources and can be handled more efficiently than write requests, the overall efficiency of the system is improved and increased.

As such, the amount of resources used to synchronize content across devices is reduced which increases the overall efficiency of the system. This increases the efficiencies of the electronic device by reducing processing times and storage resources needed to accomplish a task. Namely, this reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The messaging client application 104 is an application that includes one or more messaging application features. Such features include social network or messaging features, such as a single chat messaging feature, a group chat messaging feature, a content sharing feature, profile information feature, or a comment feature. The single chat messaging feature is a communication feature that allows two users to exchange messages with each other. The group chat messaging feature is a communication feature that allows more than two users, such as three users, to exchange messages with each other. In the group chat messaging feature, whenever a given user sends a message, the message is automatically routed to the other users in the group. The content sharing feature is a feature that allows a given user to generate content, such as an image, video, or collection of videos. The content is posted by the given user to the user's profile and is automatically shared with all of the users on the social network which are connected (unilaterally or bi-laterally) with the given user. The users on the social network access their respective social network feeds and can select a profile of the given user to view the content. In some cases, the content is only made available for viewing within a content access period, such as 24 hours after which the content is deleted from the system. The profile information feature is a feature that allows users to provide personal information, such as an avatar, a birthdate, a name, a residence, and so forth that is then made available to other users on the social network of the messaging application. The comment feature is a feature that allows one or more users on the social network to add text or video in association with content shared by another user. The text or video added by the one or more users is then shared with the other users on the social network that access the content associated with the text or video.

The third-party application(s) 105 and the messaging client application 104 are applications that include a set of functions that allow the client device 102 to access a content synchronization system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

In some cases, the messaging server system 108 maintains a table of rows that are associated with different messaging application features. Each row may store a synchronization entry or multiple synchronization entries that indicate update times of content corresponding to the messaging application feature of the row. As content updates are received from content sources, write notifications are generated for updating the synchronization entry. Namely, the write notifications indicate to recipient devices that updated content is available for a given row of the table associated with a given messaging application feature. A recipient device, at some later time during a synchronization time point, accesses the given row of the table and determines whether or not to retrieve updated content based on a last synchronization time of the recipient device. Namely, the recipient device determines whether the last synchronization timestamp when the recipient device last received an update for the given messaging application feature precedes the last time an update or write notification was received. If so, the recipient device accesses the updated content associated with the write notification and retrieves the updated content.

In some embodiments, the synchronization entry includes a last update timestamp of content associated with the messaging application feature. In some embodiments, the messaging server system 108 receives an update from a content source, such as a message sent by a given user in a group messaging feature. The messaging server system 108 transmits write notifications to update the last update timestamp of the row corresponding to the group messaging feature based on a write window associated with the group messaging feature. Namely, if the content source has provided an update to the messaging application feature within less than a certain period of time, such as a write window, (e.g., less than 100 time units ago), the messaging server system 108 may ignore the write notification and avoid updating the last update timestamp. This means that even though content has been updated by the content source more recently than the last update timestamp, the last update timestamp is not updated. In this way, if a content source frequently updates content of the messaging application feature, such frequent updates will not generate multiple write notifications and multiple updates to the last update time. However, if the content source has provided an update to the messaging application feature after more than a certain period of time (e.g., less than 100 time units ago), the messaging server system 108 updates the write notification and updates the last update timestamp with the current timestamp.

When a recipient device later requests to synchronize data corresponding to the messaging application feature, the messaging server system 108 provides updated data to the recipient device as a function of the last synchronization time during which the recipient device received an update and the write window. In some cases, the messaging server system 108 causes the recipient device to obtain updates for content having a last update timestamp that precedes the last synchronization time by the write window or by some synchronization window that is larger than the write window. As an example, if the last synchronization timestamp is 700 and the time window is 100 time units, the messaging server system 108 provides to the recipient device content updates with timestamps that are greater than 600 (e.g., any content that was received earlier than the last synchronization timestamp of 700 by 100 time units and any content that was received after the last synchronization timestamp of 700). This ensures that updated content is retrieved from a given source even though a write notification was prevented from updating the last update timestamp in the synchronization entry for the given source. Namely, the earlier last update timestamp causes the recipient device to obtain all of the updated content including the updated content associated with the last update timestamp and any content provided by the given source after the last update timestamp.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the content synchronization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the content synchronization system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The content synchronization system 124 manages synchronization of data exchanged in one or more messaging application features. For example, the content synchronization system 124 may perform operations for storing a synchronization entry for a messaging application feature, the synchronization entry comprising a last update timestamp associated with a first update to content of the messaging application feature received from a first source; receiving a second update to the content of the messaging application feature from the first source; determining that the second update was received within a write window of the last update timestamp; in response to determining that the second update was received within the write window of the last update timestamp, preventing updating the last update timestamp; and sending the first update and the second update to a client device in response to receiving a synchronization request from the client device based on the last update timestamp.

In an example, the content synchronization system 124 maintains a table of rows containing update information for different messaging application features. For example, a first row of the table may be associated with a group chat messaging feature and a second row may be associated with a profile information feature. The table may be associated with each user of the messaging client application 104. When a given client device 102 needs to synchronize its data (e.g., when a user selects a refresh option or after a specified period of time, such as 5 minutes), the given client device 102 communicates with the content synchronization system 124 to obtain the updates. In some implementations, the given client device 102 provides a token that specifies the synchronization timestamp of the last time the given client device 102 received an update from the content synchronization system 124. The content synchronization system 124 adjusts the synchronization timestamp by subtracting a synchronization window (which may be the same as the write window) from the synchronization timestamp to identify a point from which to check for updates. For example, the synchronization timestamp may be valued at 700 time units and the synchronization window may be 100 time units. In such cases, the adjusted synchronization timestamp may be computed to be 600 time units.

The content synchronization system 124 retrieves the table for associated with the given client device 102 (e.g., by using a unique identifier of the given client device 102 and a matching unique identifier of the table). The content synchronization system 124 checks synchronization entries stored in the various rows of the table to identify a set of updates that need to be provided to the given client device 102. As an example, the content synchronization system 124 retrieves a synchronization entry for a first row in the table. The content synchronization system 124 compares the adjusted synchronization timestamp to last update timestamps stored in the retrieved synchronization entry. Specifically, the content synchronization system 124 identifies a set of one or more last update timestamps that follow the adjusted synchronization timestamp. For example, the content synchronization system 124 searches for last update timestamps that are greater than 600 time units. Namely, the content synchronization system 124 searches for updates that occurred or that were received as write notifications from a point in time that follows the adjusted synchronization timestamp (e.g., that were received starting from 100 time units prior to the last time the given client device 102 received an update).

The content synchronization system 124 selects a first of the set of one or more last update timestamps. The content synchronization system 124 identifies a content source identified by the first of the set of one or more update timestamps and retrieves updated content corresponding to the selected last update timestamp from the identified content source. Specifically, the content synchronization system 124 requests from a storage location associated with the identified content source, a set of data or content, corresponding to the messaging application feature of the first row of the table, that was generated or received from the identified content source starting from the selected last update timestamp. As an example, the identified content source may be a first user and the messaging application feature may be a group chat message feature. Any chat messages sent by the first user that were directed to a second user associated with the given client device 102 and that were sent starting from the selected last update timestamp may be retrieved. For example, the selected last update timestamp may be 800 time units and the first user may have sent three messages at 800 time units, 805 time units, and 840 time units directed to the second user. These three messages may be retrieved because they were sent after the selected last update timestamp. These retrieved messages are then provided to the given client device 102 to update content of the messaging client application 104 operating on the given client device 102. Namely, the group chat messaging feature implemented on the given client device 102 may be updated to include the retrieved messages.

The content synchronization system 124 may select a second of the set of one or more last update timestamps. The content synchronization system 124 may use the information identifying a second content source and update timestamps of the identified content source to obtain updated content for the messaging application feature. Specifically, the content synchronization system 124 requests from a storage location associated with the second content source, a set of data or content, corresponding to the messaging application feature of the first row of the table, that was generated or received from the second content source starting from the selected second last update timestamp. As an example, the identified content source may be a third user and the messaging application feature may be a group chat message feature that involves the first, second and third users. Any chat messages sent by the third user that were directed to the second user associated with the given client device 102 and that were sent starting from the selected last update timestamp may be retrieved. These retrieved messages are then provided to the given client device 102 to update content of the messaging client application 104 operating on the given client device 102. Namely, the group chat messaging feature implemented on the given client device 102 may be updated to include the retrieved messages.

The content synchronization system 124 may then or concurrently with processing the first row of the table in the above manner, selected a second row associated with another messaging application feature to obtain updated content of the another messaging application feature.

In some embodiments, the content synchronization system 124 limits the number of times the last update timestamp is modified, changed or updated on a per user basis. Specifically, the content synchronization system 124 limits the number of times the last update timestamp is modified, changed, or updated when a given user generated updated content for each messaging application feature. For example, if the given user sends a second chat message directed to a particular user within a write window (e.g., within 100 time units) of a first chat message that was sent to the particular user, the last update timestamp may not be updated based on the timestamp of the second chat message. Namely, the first chat message may be sent by the given user at timestamp of 300 time units and directed to the particular user. In response, the content synchronization system 124 updates a row of a table corresponding to the single chat message feature with a last update timestamp value of 300 time units corresponding to the current timestamp of the first chat message. The last update timestamp may identify the given user. The content synchronization system 124 may store an indication of the timestamp of when the given user generated content that resulted in an update to the last update timestamp. Subsequently, after 50 time units, at 350 time units, the given user may send the second message directed to the particular user. The content synchronization system 124 may access the indication of when the given user generated content that resulted in the update to the last update timestamp. In this case, the indication specifies that the update was made at 300 time units. The content synchronization system 124 retrieves a write window associated with the messaging application feature (e.g., the single chat messaging feature) and determine that the write window is 100 time units. The content synchronization system 124 determines that the second message was generated 50 time units after the first message which is less than the size of the write window of 100 time units. In response, the content synchronization system 124 prevents the last update timestamp value from being updated. As such, even though the given user generated content that updated the messaging application feature after the last update timestamp, the last update timestamp is not changed because the second message was received before the write window expired following the first message. In this case, a second write notification associated with the second message is prevented from being sent to update the table associated with the particular user.

Subsequently, a request from the particular user may be received to refresh or synchronize data. In response, the content synchronization system 124 determines an offset of adjustment to the last time the particular user synchronized content which may be equal to the value of the write window. The content synchronization system 124 obtains last update timestamps that are greater in value than the offset of adjusted last time. In this case, the content synchronization system 124 obtains the first and second messages that were generated by the given user and directed to the particular user based on the last update timestamp that was generated and stored in response to only the first message.

In a first example, the write window is 100 time units in size. A first user (e.g., User A) may perform a synchronization operation at 700 time units. A second user (e.g., User B) may update the conversation with User A at 800 time units with updated content (U1). The synchronization entry for the conversation may be updated with the last updated timestamp of 800 time units based on the updated content U1. User A performs a synchronization operation at 825 time units. In response to the content synchronization system 124 receiving the synchronization operation at 825 time units, the content synchronization system 124 computes an adjusted synchronization time based on the last synchronization operation performed for User A at 700 time units. In this case, the adjusted synchronization time is computed to be 600 time units (the synchronization operation last performed at 700 time units minus the write window size of 100). The content synchronization system 124 determines that there are updates to the conversation that follow 600 time units because 800 time units corresponding to the last updated timestamp is after 600 time units. In response, the content synchronization system 124 accesses the conversation and obtains the updated content U1. This results in a productive read as such updated content U1 was not previously provided to the User A.

At a later time, User B updates the conversation at 850 time units with updated content (U2). In this case, the content synchronization system 124 ignores the writing timestamp of 850 time units because the conversation was last updated at 800 time units by User B. Namely, the difference between the current timestamp of 850 time units and the last updated time stamp of 800 time units—50 time units—is less than the write window of 100 time units. As such, the conversation maintains the last updated timestamp at a value of 800 time units. User A performs a synchronization operation at 1200 time units. In response to the content synchronization system 124 receiving the synchronization operation at 1200 time units, the content synchronization system 124 computes an adjusted synchronization time based on the last synchronization operation performed for User A at 825 time units. In this case, the adjusted synchronization time is computed to be 725 time units (the synchronization operation last performed at 825 time units minus the write window size of 100). The content synchronization system 124 determines that there are updates to the conversation that follow 725 time units because 800 time units corresponding to the last updated timestamp is after 725 time units. In response, the content synchronization system 124 accesses the conversation and obtains the updated content U2. In some cases, the content synchronization system 124 obtains both U1 and U2 because they are both associated with time units that follow the adjusted synchronization time of 725 time units. In such circumstances, the device of User A deletes the content U1 as a duplicate since U1 was previously obtained. In this first example, the content synchronization system 124 saved fanning out a write notification to all users and their inboxes or tables for the conversation and the users still received all updates to the conversation.

In a second example, the write window is 100 time units in size. A first user (e.g., User A) may perform a synchronization operation at 700 time units. A second user (e.g., User B) may update the conversation with User A at 800 time units with updated content (U1). The synchronization entry for the conversation may be updated with the last updated timestamp of 800 time units based on the updated content U1. User A performs a synchronization operation at 825 time units. In response to the content synchronization system 124 receiving the synchronization operation at 825 time units, the content synchronization system 124 computes an adjusted synchronization time based on the last synchronization operation performed for User A at 700 time units. In this case, the adjusted synchronization time is computed to be 600 time units (the synchronization operation last performed at 700 time units minus the write window size of 100). The content synchronization system 124 determines that there are updates to the conversation that follow 600 time units because 800 time units corresponding to the last updated timestamp is after 600 time units. In response, the content synchronization system 124 accesses the conversation and obtains the updated content U1. This results in a productive read as such updated content U1 was not previously provided to the User A.

At a later time, User A performs a synchronization operation at 1200 time units. In response to the content synchronization system 124 receiving the synchronization operation at 1200 time units, the content synchronization system 124 computes an adjusted synchronization time based on the last synchronization operation performed for User A at 825 time units. In this case, the adjusted synchronization time is computed to be 725 time units (the synchronization operation last performed at 825 time units minus the write window size of 100). The content synchronization system 124 determines that there are updates to the conversation that follow 725 time units because 800 time units corresponding to the last updated timestamp is after 725 time units. In response, the content synchronization system 124 accesses the conversation and obtains the updated content U1 that was already obtained earlier. In this example, no new messages are received because there were no updates to the conversation even though a last update timestamp is stored in the table for User A. In this second example, the content synchronization system 124 performed an unproductive read operation as users perform additional reads due to the write windows that were unnecessary.

In a third example, the write window is 100 time units in size. A first user (e.g., User A) may perform a synchronization operation at 700 time units. A second user (e.g., User B) may update the conversation with User A at 800 time units with updated content (U1). The synchronization entry for the conversation may be updated with the last updated timestamp of 800 time units based on the updated content U1. At a later time, User B updates the conversation at 805 time units with updated content (U2). In this case, the content synchronization system 124 ignores the writing timestamp of 805 time units because the conversation was last updated at 800 time units by User B. Namely, the difference between the current timestamp of 805 time units and the last updated time stamp of 800 time units—5 time units—is less than the write window of 100 time units. As such, the conversation maintains the last updated timestamp at a value of 800 time units. At a later time, User B updates the conversation at 810 time units with updated content (U3). In this case, the content synchronization system 124 ignores the writing timestamp of 810 time units because the conversation was last updated at 800 time units by User B. Namely, the difference between the current timestamp of 810 time units and the last updated time stamp of 800 time units—10 time units—is less than the write window of 100 time units. As such, the conversation maintains the last updated timestamp at a value of 800 time units. At a later time, User B updates the conversation at 890 time units with updated content (UN). In this case, the content synchronization system 124 ignores the writing timestamp of 890 time units because the conversation was last updated at 800 time units by User B. Namely, the difference between the current timestamp of 890 time units and the last updated time stamp of 800 time units—90 time units—is less than the write window of 100 time units. As such, the conversation maintains the last updated timestamp at a value of 800 time units. At a later time, User B updates the conversation at 910 time units with updated content (UN+1). In this case, the content synchronization system 124 sends a write notification to update the last updated timestamp for User A to be the current timestamp of 910. Namely, the difference between the current timestamp of 910 time units and the last updated time stamp of 800 time units—110 time units—is greater than the write window of 100 time units. As such, the conversation updates the last updated timestamp with the current timestamp value of 910.

User A performs a synchronization operation at 1200 time units. In response to the content synchronization system 124 receiving the synchronization operation at 1200 time units, the content synchronization system 124 computes an adjusted synchronization time based on the last synchronization operation performed for User A at 700 time units. In this case, the adjusted synchronization time is computed to be 600 time units (the synchronization operation last performed at 700 time units minus the write window size of 100). The content synchronization system 124 determines that there are updates to the conversation that follow 600 time units because 910 time units corresponding to the last updated timestamp is after 600 time units. In response, the content synchronization system 124 accesses the conversation and obtains the updated content U1–UN+1 (all the updates performed by User B). In this scenario, many of the costly write notifications or write fanouts were avoided using the write window and the User A still received all of the updates when User A performed a synchronization operation.

The size of the write window may vary across rows of the table of different messaging application features. For example, a group chat messaging feature may be associated with a write window that is smaller or larger than a profile information feature. As an example, the write window is 200 time units in size for the profile information feature. A first user (e.g., User A) may perform a synchronization operation at 700 time units. A second user (e.g., User B) may update the profile of the second user User B at 800 time units with updated content (U1) (e.g., User B may update an address stored in the profile that is shared with other users including User A). The synchronization entry for the profile information feature may be updated with the last updated timestamp of 800 time units based on the updated content U1. At a later time, User B updates the profile of the second user at 805 time units with updated content (U2) (e.g., User B may update the avatar stored in the profile). In this case, the content synchronization system 124 ignores the writing timestamp of 805 time units because the conversation was last updated at 800 time units by User B. Namely, the difference between the current timestamp of 805 time units and the last updated time stamp of 800 time units—5 time units—is less than the write window of 200 time units. As such, the profile information row maintains the last updated timestamp at a value of 800 time units.

User A performs a synchronization operation at 1200 time units. In response to the content synchronization system 124 receiving the synchronization operation at 1200 time units, the content synchronization system 124 computes an adjusted synchronization time based on the last synchronization operation performed for User A at 700 time units. In this case, the adjusted synchronization time is computed to be 600 time units (the synchronization operation last performed at 700 time units minus the write window size of 100). The content synchronization system 124 determines that there are updates to the conversation that follow 600 time units because 800 time units corresponding to the last updated timestamp is after 600 time units. In response, the content synchronization system 124 accesses the profile information for User B and obtains the updated content U1 and U2 (all the updates performed by User B).

The size of the write window may vary based on patterns of different users. For example, a first user (e.g., a celebrity or a user with a popularity that exceeds a threshold) may have a write window for a given feature of the messaging application that is different from the write window of a second user for the same given feature of the messaging application. Specifically, if the content synchronization system 124 determines that the first user is more active and generates and shares content with a higher frequency than the second user, the content synchronization system 124 may associate a larger write window with the first user than with the second user. As another example, the second user may infrequently post content to the messaging application feature. In such circumstances, the second user may be associated with a smaller write window (or not write window at all) than the first user. As another example, the write window size may vary based on days of the week. For example, the content synchronization system 124 may determine that the first user is very active and frequently (e.g., sends more than a threshold number of messages per hour) generates and shares content on Mondays but does not frequently generate and share content (e.g., sends less than the threshold number of messages per hour) on Fridays. In such cases, the content synchronization system 124 may employ a write window having a first size for the first user on Mondays and a write window having a second size for the first user on Fridays. The first size may be larger than the second size.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes usernames, passwords, addresses, friends, activity information, preferences, videos or content consumed by the user, and so forth.

Figure 2:
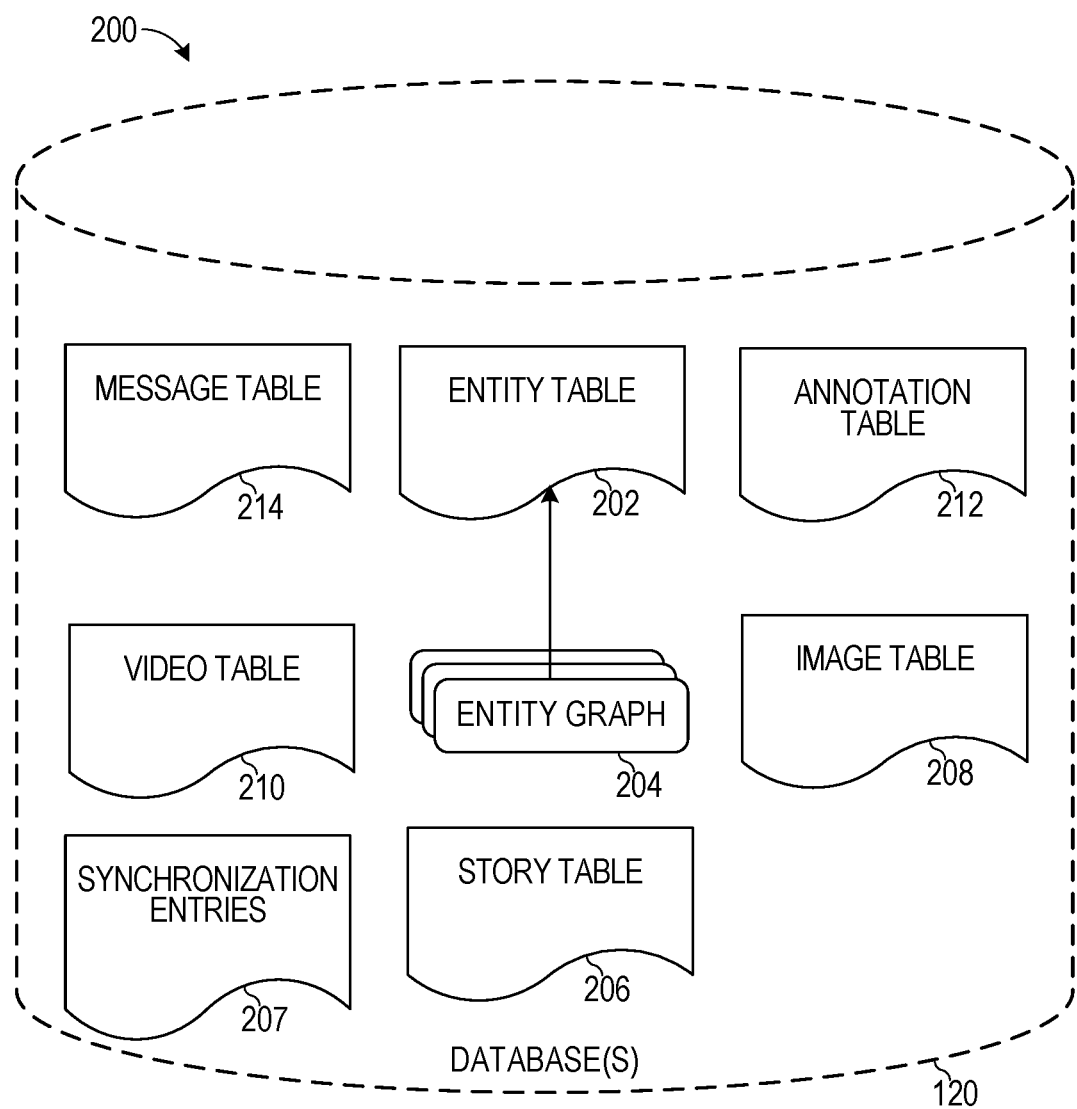
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212, Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Synchronization entries 207 stores various information about messaging application feature synchronization. For example, the synchronization entries 207 maintains a table of rows that include the last update timestamps for each messaging application feature for each user. The synchronization entries 207 also stores the write window size of each messaging application feature and for each user of the messaging client application 104. The synchronization entries 207 also stores the last synchronization time of each client device 102. The synchronization entries 207 also stores the synchronization time window for each feature of the messaging client application 104. Based on the timestamps and windows stored in the synchronization entries 207, the content synchronization system 124 enables client devices 102 to synchronize content and the content synchronization system 124 gates or prevents write notifications for content updates that are received within a write window of each other.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
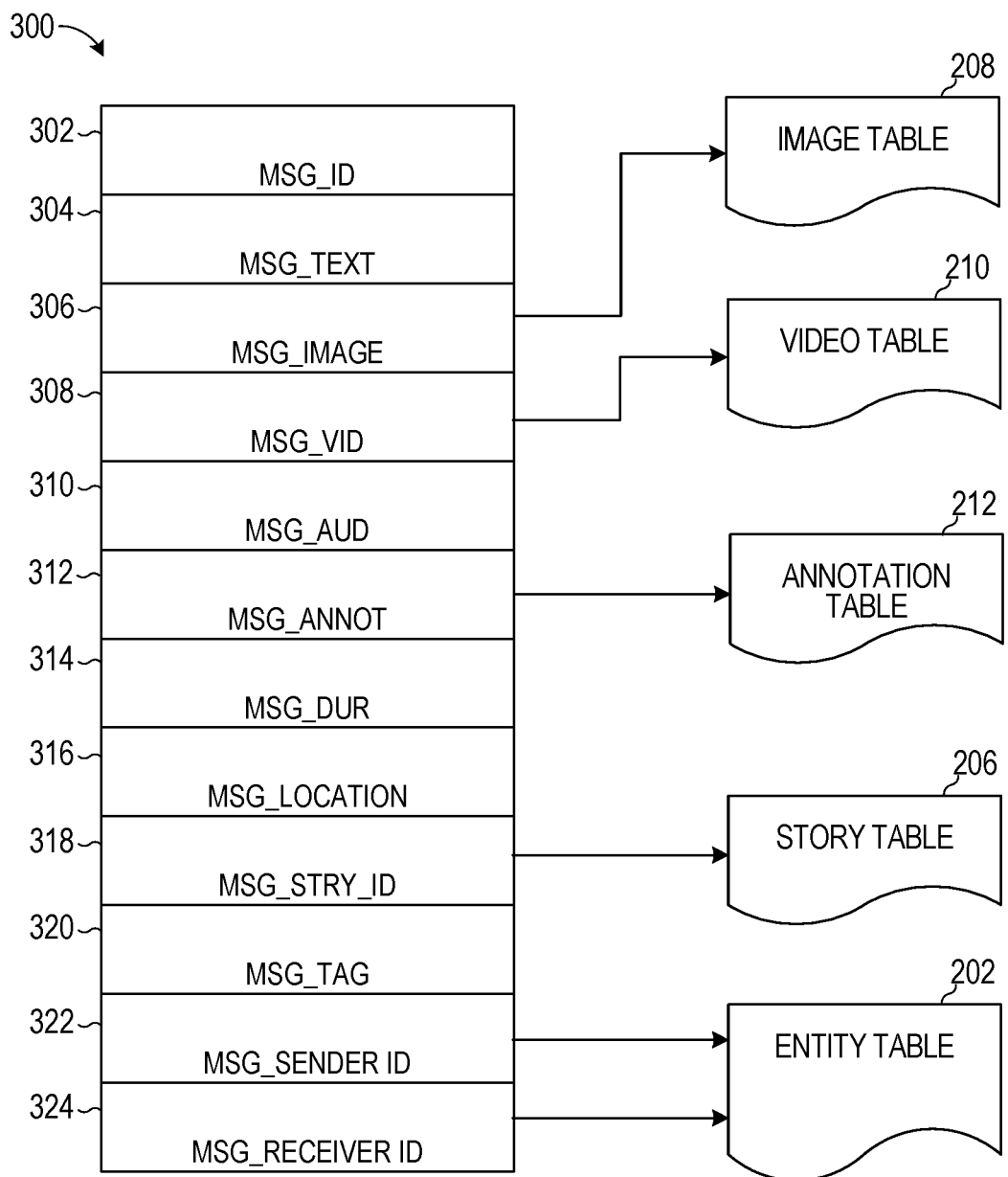
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
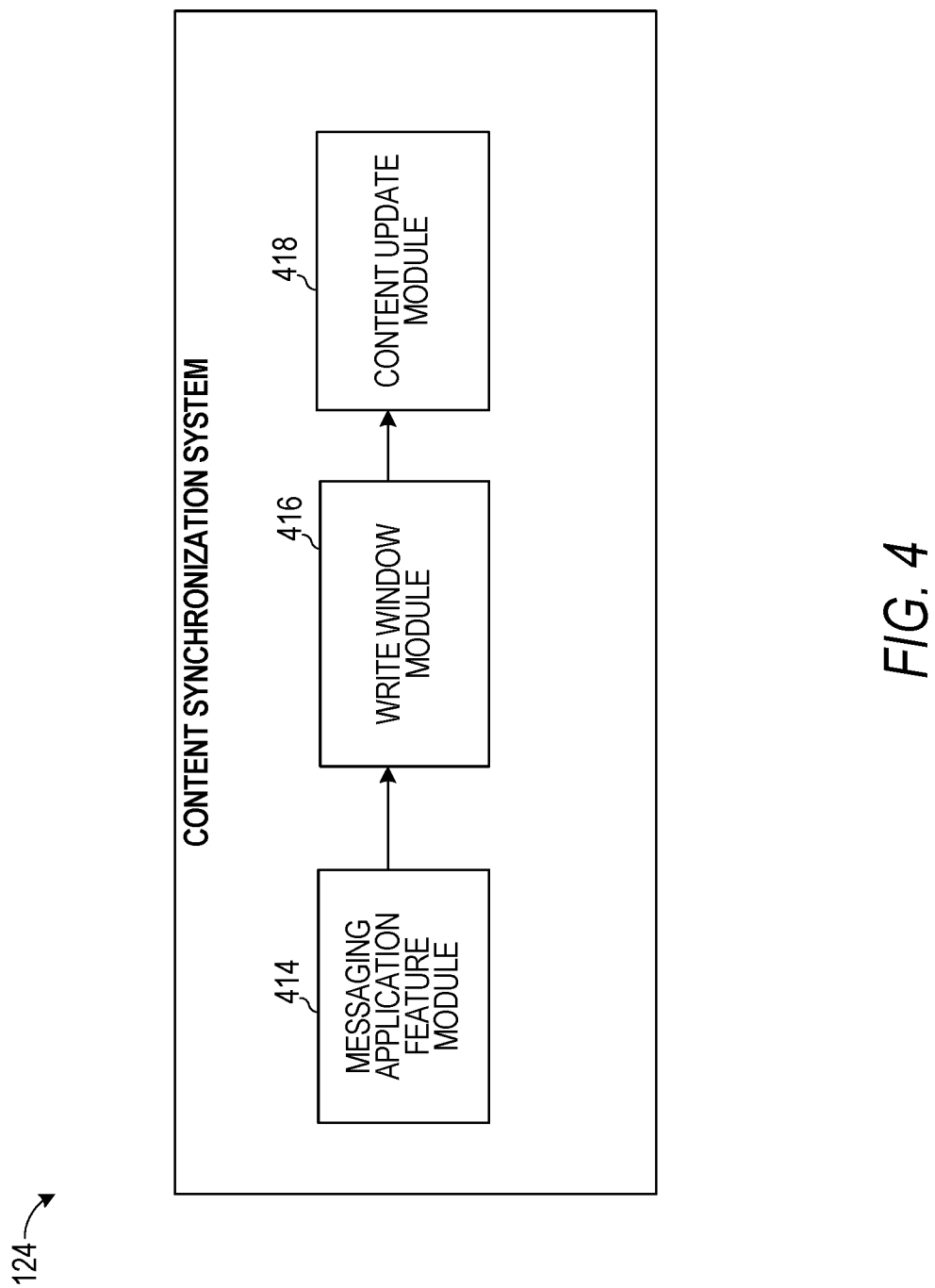
FIG. 4 is a block diagram showing an example content synchronization system, according to example embodiments.

FIG. 4 is a block diagram showing an example content synchronization system 124, according to example embodiments. Content synchronization system 124 includes messaging application feature module 414, a write window module 416, and a content update module 418. The messaging application feature module 414 establishes communication sessions between users and provides access to one or more features of the messaging application to various users. The messaging application feature module 414 receives content updates from one or more users and communicates with the write window module 416 to update or prevent updating last update timestamps associated with the content update feature.

As an example, the messaging application feature module 414 receives a first chat message from a first user that is directed to a second user. The messaging application feature module 414 obtains a timestamp of the first chat message. The messaging application feature module 414 communicates with the write window module 416 to obtain the write window corresponding to the chat message feature. The messaging application feature module 414 obtains from the synchronization entries 207 the last update timestamp for the first user and for the chat message feature. Specifically, the messaging application feature module 414 obtains the last update timestamp reflecting when the last time the first user sent a message directed to the second user. The messaging application feature module 414 does not obtain the last update timestamp of messages sent by the first user to a third user (e.g., the messaging application feature module 414 does not obtain the last update timestamp associated with a different messaging application feature). The messaging application feature module 414 and the write window module 416 determine whether timestamp of the first chat message received from the first user is within a threshold of the last update timestamp. Specifically, the write window module 416 computes a difference between the timestamp of the first chat message and the last update timestamp of the first user. The write window module 416 determines whether the difference exceeds the write window. In response to determining that the difference does not exceed the write window (e.g., the newly received chat message was received before the write window expired which started when the last message was received from the first user), the write window module 416 prevents updating the last update timestamp in the synchronization entries 207. In response to determining that the difference exceeds the write window that a last update timestamp has not been previously stored for the first user in association with a message directed to the second user from the first user), the write window module 416 stores or updates the last update timestamp with the timestamp of the received first chat message.

The messaging application feature module 414 receives a second chat message from a third user that is directed to the second user. The messaging application feature module 414 obtains a timestamp of the second chat message. The messaging application feature module 414 communicates with the write window module 416 to obtain the write window corresponding to the chat message feature for the third user. The messaging application feature module 414 obtains from the synchronization entries 207 the last update timestamp for the third user and for the chat message feature. Specifically, the messaging application feature module 414 obtains the last update timestamp reflecting when the last time the third user sent a message directed to the second user. The messaging application feature module 414 and the write window module 416 determine whether timestamp of the second chat message received from the third user is within a threshold of the last update timestamp of the third user. Specifically, the write window module 416 computes a difference between the timestamp of the second chat message and the last update timestamp of the third user. The write window module 416 determines whether the difference exceeds the write window of the third user. In response to determining that the difference does not exceed the write window (e.g., the newly received chat message was received before the write window expired which started when the last message was received from the first user), the write window module 416 prevents updating the last update timestamp in the synchronization entries 207. In response to determining that the difference exceeds the write window that a last update timestamp has not been previously stored for the third user in association with a message directed to the second user from the third user), the write window module 416 stores or updates the last update timestamp with the timestamp of the received second chat message.

The content update module 418 receives a request from a client device 102 to synchronize content of the messaging client application 104. In response, the content update module 418 determines an offset of adjustment to the last time the particular user or client device 102 synchronized content which may be equal to the value of the write window for the messaging application feature. The content update module 418 obtains last update timestamps that are greater in value than the offset of adjusted last time. In this case, the content update module 418 obtains the first and second chat messages that were generated by the first and third users and directed to the second user based on the last update timestamps that was generated and stored in the synchronization entries 207.

Figure 5:
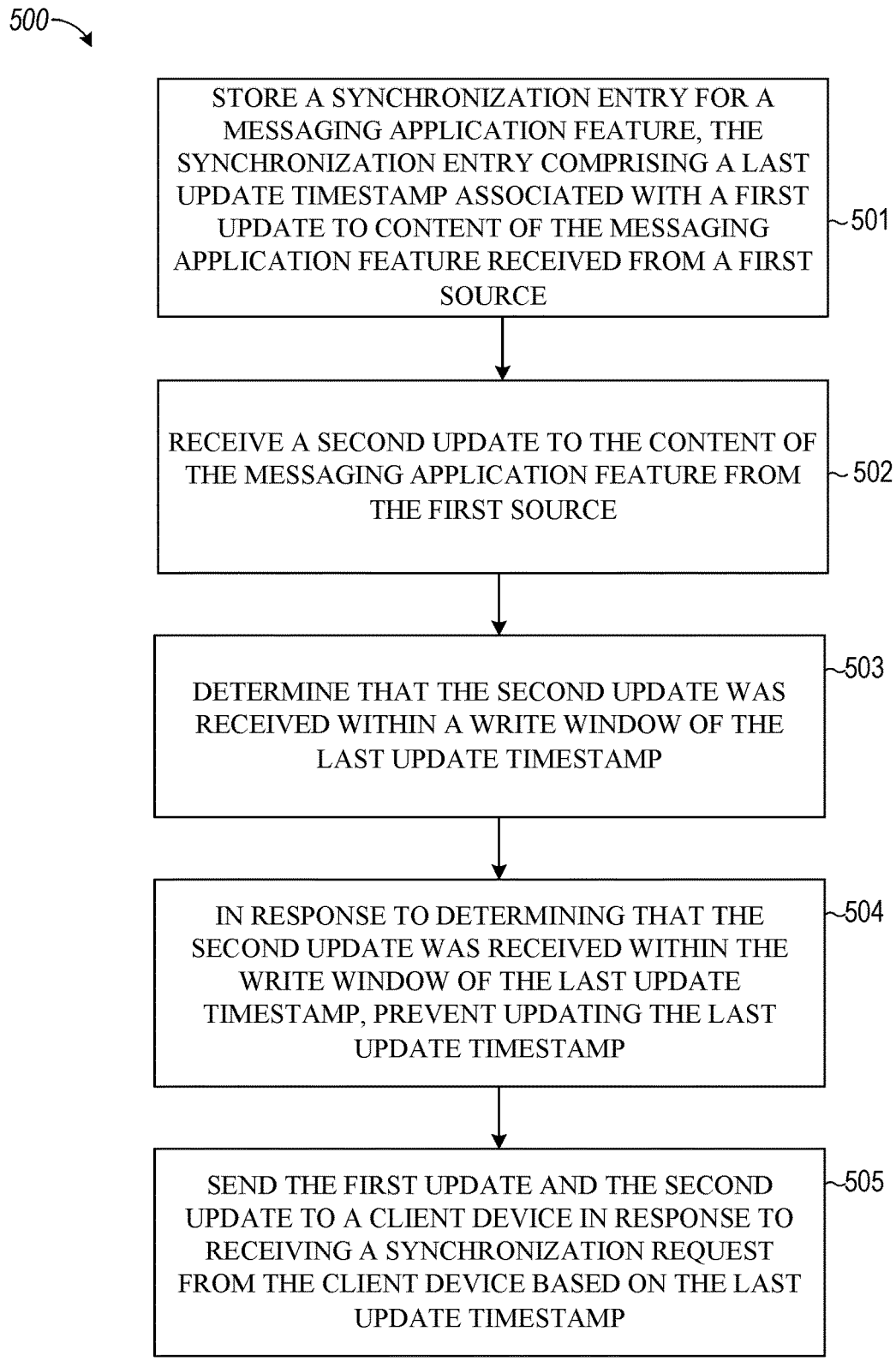
FIGS. 5-7 are flowcharts illustrating example operations of the content synchronization system, according to example embodiments.
Figure 6:
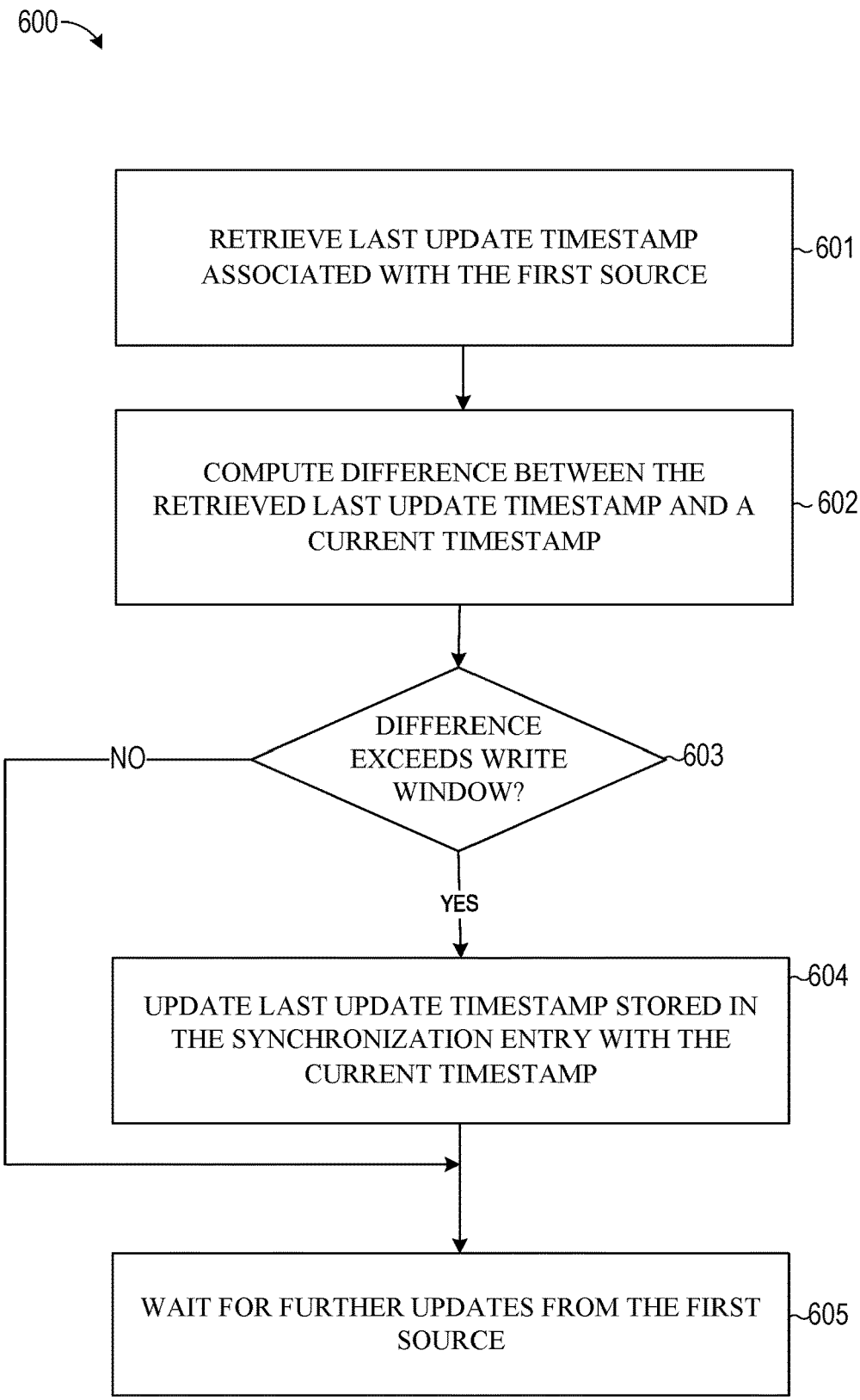
Figure 7:
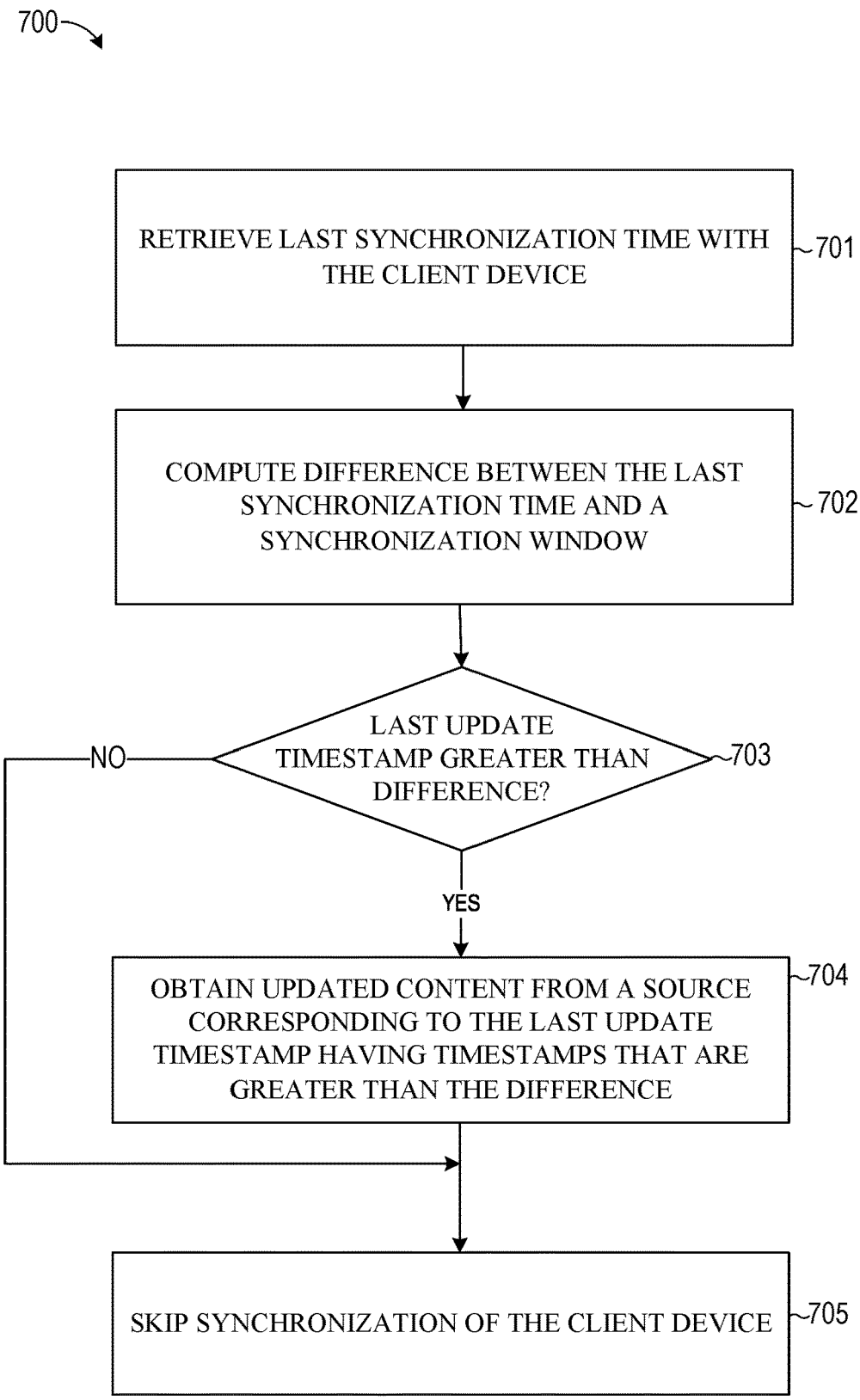

FIGS. 5-7 are flowcharts illustrating example operations of the content synchronization system 124 in performing processes 500-700, according to example embodiments. The processes 500-700 may be embodied in computer-readable instructions for execution by one or more processors such that the operations of the processes 500-700 may be performed in part or in whole by the functional components of the messaging server system 108 and/or third-party application 105; accordingly, the processes 500-700 are described below by way of example with reference thereto. However, in other embodiments, at least some of the operations of the processes 500-700 may be deployed on various other hardware configurations. The processes 500-700 are therefore not intended to be limited to the messaging server system 108 and can be implemented in whole, or in part, by any other component. Some or all of the operations of processes 500-700 can be in parallel, out of order, or entirely omitted.

At operation 501, the content synchronization system 124 stores a synchronization entry for a messaging application feature, the synchronization entry comprising a last update timestamp associated with a first update to content of the messaging application feature received from a first source. For example, the content synchronization system 124 may initiate a communication session between a plurality of users. The content synchronization system 124 may generate a synchronization entry for the communication session that indicates the last update timestamps of when each of the users generated and submitted content in the communication session.

At operation 502, the content synchronization system 124 receives a second update to the content of the messaging application feature from the first source. For example, the content synchronization system 124 receives a new chat message from a first user in the communication session that is directed to a second user of the communication session.

At operation 503, the content synchronization system 124 determines that the second update was received within a write window of the last update timestamp. For example, the content synchronization system 124 retrieves the write window for the communication session feature and determines whether the first user has previously sent a message directed to the second user within a span of time that is the size of the write window from when the second update was received.

At operation 504, the content synchronization system 124 in response to determining that the second update was received within the write window of the last update timestamp, prevents updating the last update timestamp. For example, if the first user has sent a chat message directed to the second user within 100 time units of a previous chat message the first user sent, the content synchronization system 124 prevents updating the last update timestamp for the first user in the communication session.

At operation 505, the content synchronization system 124 sends the first update and the second update to a client device in response to receiving a synchronization request from the client device based on the last update timestamp. For example, the content synchronization system 124 receives a synchronization request from a client device 102 of the second user. The content synchronization system 124 determines a last synchronization time and adjusts the last synchronization time by a synchronization window (which may be the same size as the write window). The content synchronization system 124 retrieves updates in the communication session that are associated with last update timestamps that follow the adjusted last synchronization time.

In some embodiments, the content synchronization system 124 performs process 600 to determine whether or not to prevent a write notification for a given content update received from a particular user. At operation 601, the content synchronization system 124 retrieves a last update timestamp associated with the first source. For example, the content synchronization system 124 retrieves from the synchronization entries 207 the last update timestamp of the first user indicating the last time the timestamp was updated based on a write notification generated by the first user.

At operation 602, the content synchronization system 124 computes a difference between the retrieved last update timestamp and a current timestamp. For example, the content synchronization system 124 computes a difference between the last update timestamp stored in the synchronization entries 207 for the first user and the timestamp of the new message or update received from the first user.

At operation 603, the content synchronization system 124 determines whether the difference exceeds a write window. In response to determining that the difference exceeds the write window, the process proceeds to operation 604, otherwise the process proceeds to operation 605.

At operation 604, the content synchronization system 124 updates the last update timestamp stored in the synchronization entry with the current timestamp. For example, the content synchronization system 124 replaces the last update timestamp stored for the first user in the synchronization entries 207 with the current timestamp. Namely, the content synchronization system 124 enables the write notification to be written to the synchronization entries 207.

At operation 605, the content synchronization system 124 waits for further updates from the first source. For example, the content synchronization system 124 prevents the write notification from causing an update to the synchronization entries 207 if the new content update was received within the write window of the last update timestamp for the first user.

In some embodiments, the content synchronization system 124 performs process 700 to synchronize content for a particular user when a synchronization or refresh request is received from a client device 102 of the particular user. At operation 701, the content synchronization system 124 retrieves a last synchronization time with the client device. For example, the content synchronization system 124 receives a synchronization request from the client device 102 of the particular user. The request may include a token that specifies the synchronization timestamp of the last time the client device 102 synchronized content.

At operation 702, the content synchronization system 124 computes a difference between the last synchronization time and a synchronization window. For example, the content synchronization system 124 obtains a synchronization window for the client device 102. In some cases, the content synchronization system 124 obtains, as the synchronization window, the value of the write window used to prevent write notifications from being used to update the last update timestamp. The content synchronization system 124 computes an adjusted synchronization time by subtracting the synchronization window from the synchronization timestamp of the client device 102.

At operation 703, the content synchronization system 124 determines whether the last update timestamp is greater than the difference. In response to determining that the last update timestamp is greater than the difference, the process proceeds to operation 604, otherwise the process proceeds to operation 605.

At operation 704, the content synchronization system 124 obtains updated content from a source corresponding to the last update timestamp having timestamps that are greater than the difference. For example, the content synchronization system 124 retrieves content from the first user that was generated by the first user with a timestamp that is later than the adjusted synchronization timestamp.

At operation 705, the content synchronization system 124 skips synchronization of the client device. For example, the content synchronization system 124 determines that no content exists with a last update timestamp that follows the adjusted synchronization timestamp and, in response, may not provide any updates to the client device 102.

Figure 8:
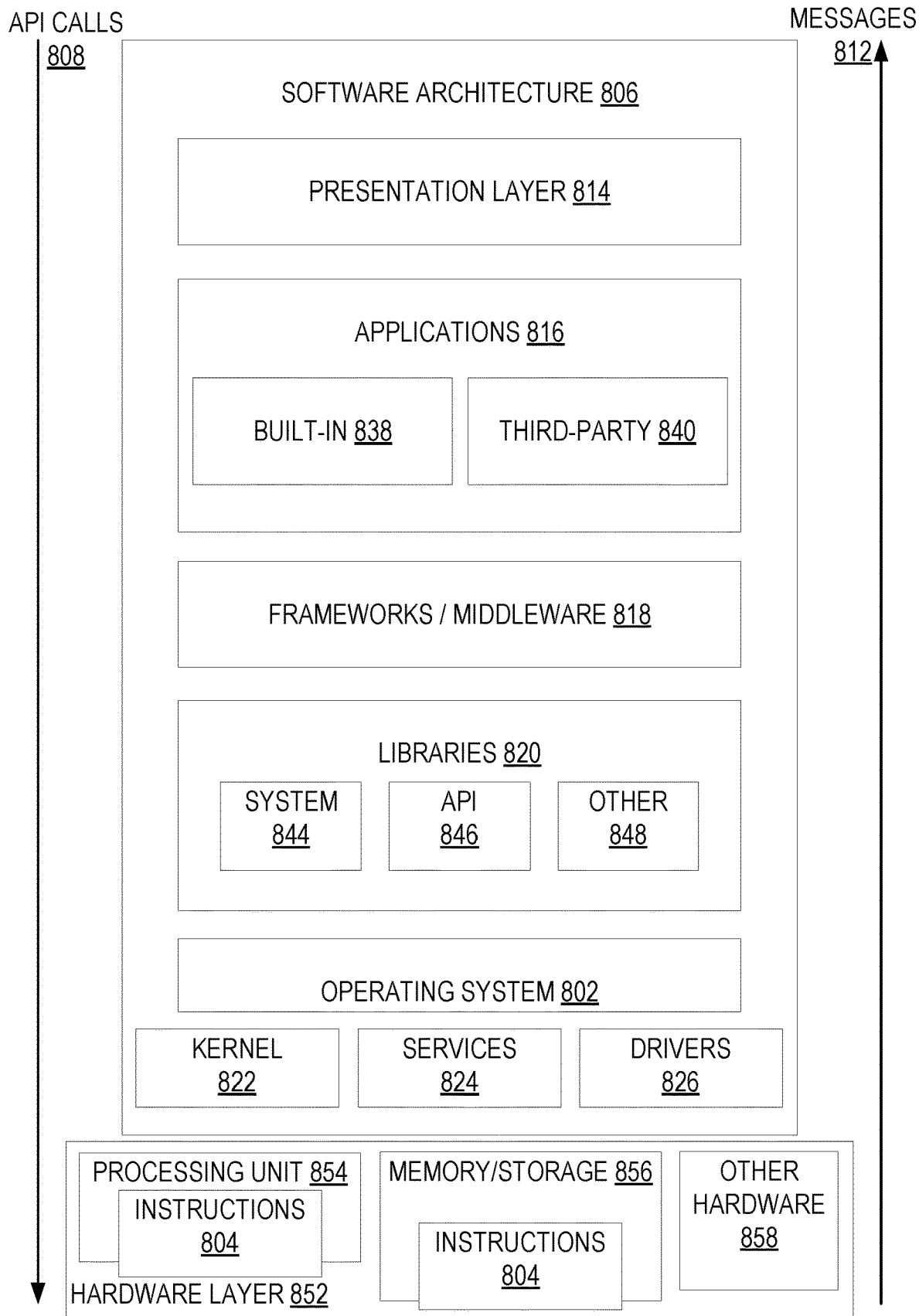
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGI, framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
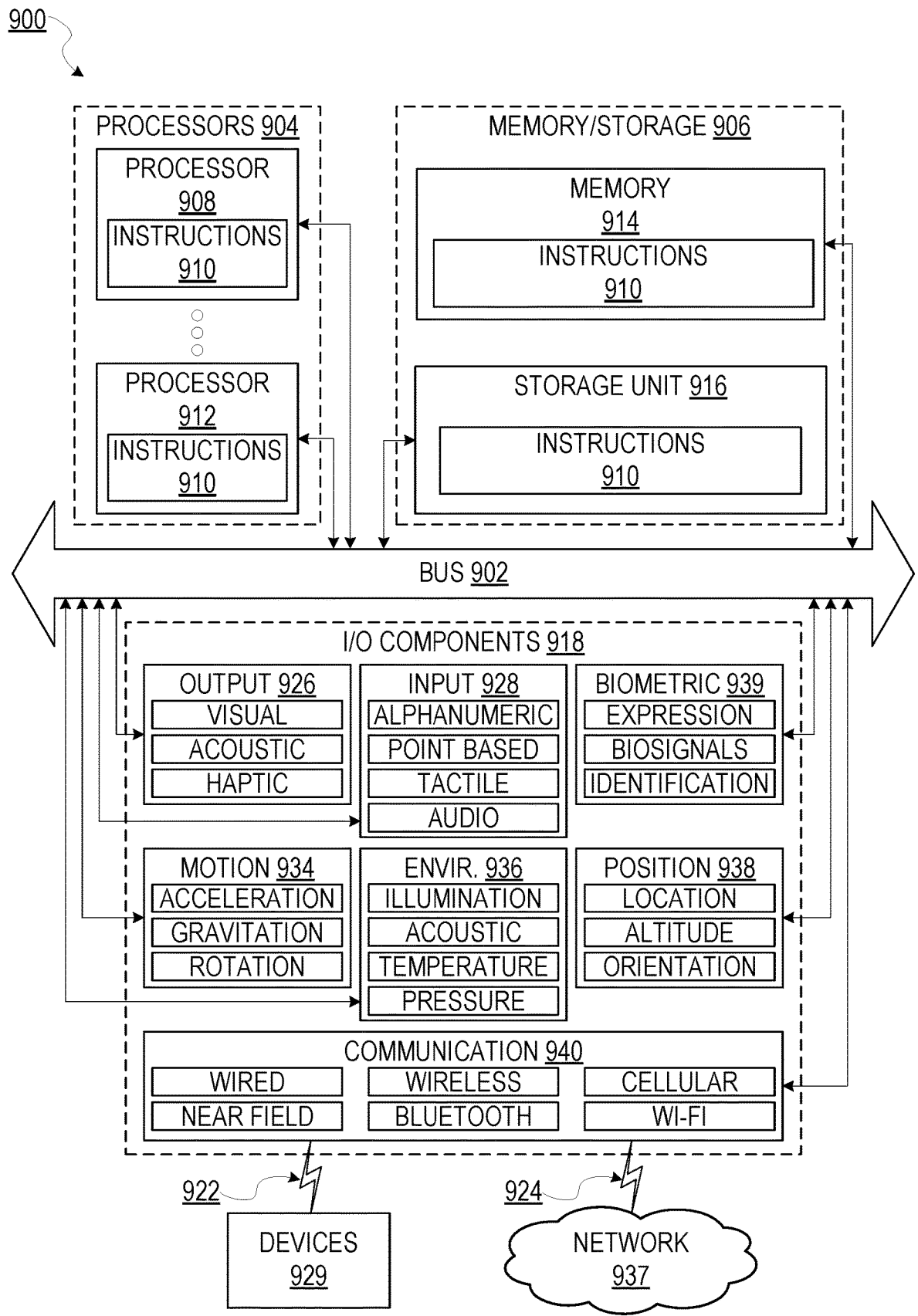
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (CPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores (e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via. Internet Protocol (IP) geolocation, location via Wi-Fi® signal triangulation, location via detecting a NFC beacon signal that may indicate a particular location, and so forth.

Glossary

"CARRIER SIGNAL," in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE," in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API). The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR," in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a CPU, a RISC processor, a CISC processor, a GPU, a DSP, an ASIC, a MC or any combination thereof. A processor 908 may further be a multi-core processor having two or more independent processors 904 (sometimes referred to as "cores") that may execute instructions 910 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   storing, by one or more processors of a computing device, a synchronization entry for a messaging application feature, the synchronization entry comprising a last update timestamp associated with a first update associated with the messaging application feature received from a first source, the last update timestamp representing a point in time when one or more updates associated with the messaging application feature have been received;
   receiving a second update associated with the messaging application feature from the first source;
   determining whether the second update was received within a write window of the last update timestamp, the write window having a specified size;
   in response to determining that the second update was received within the write window of the last update timestamp, preventing updating the last update timestamp;
   in response to determining that the second update was received outside the write window of the last update timestamp, updating the last update timestamp to reflect a current time at which the second update was received; and
   sending the first update and the second update to a client device in response to receiving a synchronization request from the client device based on the last update timestamp.

2. The method of claim 1, further comprising:
   receiving the synchronization request from the client device; and
   computing a synchronization time of the messaging application feature based on the synchronization request and the write window.

3. The method of claim 2, further comprising:
   determining that the last update timestamp of the synchronization entry is greater the synchronization time; and
   retrieving the first update and the second update from the first source in response to determining that the last update timestamp of the synchronization entry is greater the last synchronization time.

4. The method of claim 2, wherein the synchronization time is computed by subtracting the write window from a last synchronization timestamp indicating a last time the client device was synchronized.

5. The method of claim 4, further comprising retrieving data associated with the messaging application feature that is associated with an update timestamp that follows the synchronization time.

6. The method of claim 2, wherein the synchronization time is computed by subtracting a synchronization window from a last synchronization timestamp indicating a last time the client device was synchronized, wherein the synchronization window is larger than the write window.

7. The method of claim 1, wherein the first source is a first user, and wherein the client device is associated with a second user.

8. The method of claim 1, wherein the messaging application feature comprises at least one of a single chat messaging feature, a group messaging feature, a content sharing feature, profile information feature, or a comment feature.

9. The method of claim 8, wherein the single chat messaging feature is associated with a first write window that is smaller than a second write window associated with the group messaging feature.

10. The method of claim 1, further comprising:
    receiving a third update associated with the messaging application feature from the first source;
    determining that the third update was received after the write window measured from the last update timestamp; and
    in response to determining that the third update was received after the write window, updating the last update timestamp with a current timestamp.

11. The method of claim 1, wherein determining that the second update was received within a write window of the last update timestamp comprises:
retrieving the last update timestamp from the synchronization entry associated with the first source;
retrieving the write window associated with the messaging application feature;
obtaining a current timestamp of the second update;
computing a difference between the last update timestamp and the current timestamp;
comparing the difference to the write window; and
determining that the difference is less than the write window.

12. The method of claim 1, wherein the synchronization entry maintains a last update timestamp for each source associated with the messaging application feature.

13. The method of claim 1, wherein a size of the write window corresponds to a number of write and read messages a given update to the messaging application feature generates, wherein a first write window having a first size generates a first frequency of read messages, and wherein a second write window having a second size, smaller than the first size, generates a second frequency of read messages, and wherein the second frequency is different from the first frequency.

14. The method of claim 1, wherein the last update timestamp is a first last update timestamp associated with the first source, further comprising:
receiving a third update associated with the messaging application feature from a second source;
retrieving a second last update timestamp for the second source;
determining that the third update was received after the write window measured from the second last update timestamp; and
in response to determining that the third update was received after the write window, updating the second last update timestamp with a current timestamp.

15. The method of claim 1, further comprising:
storing the synchronization entry in a table of synchronization entries, each synchronization entry in the table comprises a row in the table; and
retrieving the synchronization entry from a corresponding row in the table to obtain the last update timestamp.

16. The method of claim 1, further comprising in response to receiving the synchronization request from the client device, providing, to the client device, data corresponding to the messaging application feature from a time earlier than a last time the client device was synchronized, wherein the write window varies based on patterns of use associated with different users of the messaging application.

17. The method of claim 1, wherein the messaging application feature is a first messaging application feature, the messaging application comprising a second messaging application feature, wherein the write window is a first write window associated with the first messaging application feature that differs from a second write window associated with the second messaging application feature.

18. The method of claim 1, wherein the write window is a first write window associated with a group chat messaging feature and is of a different size than a second write window associated with a profile information feature.

19. A system comprising:
one or more processors of a computing device; and
a memory storing instructions that, when executed by the one or more processors, configure the one or more processors to perform operations comprising:
storing a synchronization entry for a messaging application feature, the synchronization entry comprising a last update timestamp associated with a first update associated with the messaging application feature received from a first source, the last update timestamp representing a point in time when one or more updates associated with the messaging application feature have been received;
receiving a second update associated with the messaging application feature from the first source;
determining that the second update was received within a write window of the last update timestamp, the write window having a specified size;
in response to determining that the second update was received within the write window of the last update timestamp, preventing updating the last update timestamp;
in response to determining that the second update was received outside the write window of the last update timestamp, updating the last update timestamp to reflect a current time at which the second update was received; and
sending the first update and the second update to a client device in response to receiving a synchronization request from the client device based on the last update timestamp.

20. A non-transitory computer-readable storage medium, the computer-readable storage medium including instructions that when executed by one or more processors of a computing device, cause the one or more processors to perform operations comprising:
storing a synchronization entry for a messaging application feature, the synchronization entry comprising a last update timestamp associated with a first update associated with the messaging application feature received from a first source, the last update timestamp representing a point in time when one or more updates associated with the messaging application feature have been received;
receiving a second update associated with the messaging application feature from the first source;
determining that the second update was received within a write window of the last update timestamp, the write window having a specified size;
in response to determining that the second update was received within the write window of the last update timestamp, preventing updating the last update timestamp;
in response to determining that the second update was received outside the write window of the last update timestamp, updating the last update timestamp to reflect a current time at which the second update was received; and
sending the first update and the second update to a client device in response to receiving a synchronization request from the client device based on the last update timestamp.

* * * * *